(12) United States Patent
Worrell et al.

(10) Patent No.: US 6,778,941 B1
(45) Date of Patent: Aug. 17, 2004

(54) MESSAGE AND USER ATTRIBUTES IN A MESSAGE FILTERING METHOD AND SYSTEM

(75) Inventors: Steven W. Worrell, Dayton, OH (US); Steven K. Rogers, Beavercreek, OH (US); Matthew Kabrisky, Dayton, OH (US); Philip Amburn, Dayton, OH (US)

(73) Assignee: Qualia Computing, Inc., Beavercreek, OH (US)

( * ) Notice: Subject to any disclaimer, the term of this patent is extended or adjusted under 35 U.S.C. 154(b) by 170 days.

(21) Appl. No.: 10/010,789

(22) Filed: Nov. 13, 2001

Related U.S. Application Data

(60) Provisional application No. 60/248,430, filed on Nov. 14, 2000.

(51) Int. Cl.[7] .......................... G04F 1/00; G04F 10/00; G04F 3/00; G04F 5/00; G04F 7/00
(52) U.S. Cl. ...................... 702/176; 709/202; 709/203; 709/206; 709/207; 715/500; 715/501.1; 707/100
(58) Field of Search .................. 702/176; 709/206, 709/207, 230, 202; 715/500, 501.1; 707/100

(56) References Cited

U.S. PATENT DOCUMENTS

| | | | |
|---|---|---|---|
| 5,619,648 A | | 4/1997 | Canale et al. |
| 5,905,863 A | * | 5/1999 | Knowles et al. ............ 709/206 |
| 5,924,105 A | | 7/1999 | Punch, III et al. |
| 6,052,709 A | * | 4/2000 | Paul ........................... 709/202 |
| 6,073,133 A | | 6/2000 | Chrabaszez |
| 6,073,142 A | * | 6/2000 | Geiger et al. ................ 715/500 |
| 6,192,360 B1 | | 2/2001 | Dumais et al. |
| 6,199,102 B1 | * | 3/2001 | Cobb .......................... 709/206 |
| 6,202,058 B1 | | 3/2001 | Rose et al. |
| 6,236,768 B1 | | 5/2001 | Rhodes et al. |
| 6,356,935 B1 | * | 3/2002 | Gibbs ......................... 709/206 |
| 6,393,465 B2 | * | 5/2002 | Leeds ......................... 709/207 |
| 6,442,589 B1 | * | 8/2002 | Takahashi et al. .......... 709/203 |
| 6,453,327 B1 | * | 9/2002 | Nielsen ....................... 715/500 |
| 2002/0016824 A1 | * | 2/2002 | Leeds ......................... 709/207 |
| 2002/0198950 A1 | * | 12/2002 | Leeds ......................... 709/206 |

FOREIGN PATENT DOCUMENTS

| | | |
|---|---|---|
| EP | 1 087 315 A2 | 3/2001 |
| WO | WO 01/27828 A2 | 4/2001 |

* cited by examiner

*Primary Examiner*—Aditya S. Bhat
(74) *Attorney, Agent, or Firm*—Stevens & Showalter LLP

(57) ABSTRACT

A method and system for filtering messages where the importance of a message is determined by analyzing the message body in conjunction with message attributes. Message body refers to the text in the body of the message, whereas message attributes convey information about the message. In another embodiment, analysis of the user's current computing environment provides additional input to the filtering system. This allows for preferentially weighting messages of user's current interests. Analysis includes computation of feature vectors and subsequent input to a discriminant function. The discriminant function provides a test statistic which is compared to a threshold. If the test statistic exceeds the threshold, the incoming message is passed by the filtering system and may be displayed to the user. In another embodiment, message body and attributes are used to anticipate significant events in a time series, such as streaming financial data.

15 Claims, 16 Drawing Sheets

Probability of passing non-important message

Words of Feature Set:
below, demand, failed, revenues, delayed, expect, profit, shipments, earnings, revenue, bad, slower, futures, outlook, quarterly, competitive, upgrade, delay, percentage, drop

MESSAGE AND USER ATTRIBUTES IN A MESSAGE FILTERING METHOD AND SYSTEM

CROSS REFERENCE TO RELATED APPLICATION

The benefit of prior U.S. Provisional Application No. 60/248,430 filed Nov. 14, 2000 is hereby claimed.

BACKGROUND OF THE INVENTION

1. Field of the Invention

The invention concerns message filtering. Message filtering is the process of determining whether or not a message, one of many in a stream, should be passed to a user. Typically, only a small fraction of the messages in the stream are considered important by the user.

2. Description of the Prior Art

Human users of electronic information systems are faced with finding useful information in the midst of ever-increasing amounts of irrelevant inputs. An illustrative situation is the screening of relevant from irrelevant email messages. Canale et al. have proposed reducing the amount of junk e-mail received (U.S. Pat. No. 5,619,648). Here, each sender of an email system provides a recipient description field as part of a message. The user's mail filter has a model describing user preferences that is accessible by the email sender. Messages with recipient descriptions matching the user preferences are passed. Drawbacks to this approach include the overhead to the sender in the specification of recipient descriptions, and situations where unimportant messages are passed because of a match in the recipient/preference pair. Cobb (U.S. Pat. No. 6,199,102) describes a method for filtering unsolicited email by way of an automated challenge and response scheme. A challenge is initiated when a sender is not on an approved sender list at the recipient site. Two problems with this approach are that it requires users to specify who they will receive messages from, implying that important information comes only from currently known senders, and that unimportant messages from approved senders will be passed to the user.

Rather than filtering messages based solely on sender/receiver characteristic matching, text classification approaches estimate "importance" by analyzing word content of incoming messages. Dumais et al. describe a text classifier (U.S. Pat. No. 6,192,360). In this method, features are computed from the text object. A training phase provides a weight vector and a monotonic function essentially defining a classifier. The weight vector may be found by means of support vector machine training and the monotonic function may be determined by optimization means. Given the weight vector and monotonic function, messages are classified by applying the feature vector from that message to the weight vector and monotonic function. When the result from the monotonic function is above a threshold, the message is passed to the user.

A similar method for text classification is given in the specification of Punch et al. (U.S. Pat. No. 5,924,105). Feature vectors are computed from the text of messages. The feature vectors are input to trained classifiers, resulting in a score for that message. The message is then passed to the user or not based on the relation of the score to a threshold.

Both of these text classification methods rely solely on the text of the incoming message to determine importance. No information outside of message text is used to augment the classification. For example, Rhodes et al., in U.S. Pat. No. 6,236,768, describe a method and system for substantially continuous retrieval of indexed documents related to the user's current context. Indexing involves analyzing the document and storing a representation of that document that is amenable to fast search methods. User context is obtained by monitoring various aspects of the user's computational and physical environment. The "various aspects" are referred to as meta-information, where meta-information is information about the information. Furthermore, meta-information may be explicitly entered by the user, or automatically tagged with context information when the document is created. Examples given by Rhodes include room number, GPS location, time of day, day of the week, people present and so on. Even in traditional desktop environments, meta-information related to time and general subject can provide cues bearing on the relevance. Relevance estimates are improved over methods using text similarity alone by the inclusion of the meta-information. While it is clear that the meta-information is useful for finding relevant documents in the indexed database, the creation of the indexed database can be time consuming and is typically created by running an application overnight. Thus, the invention of Rhodes et al. is useful for finding indexed documents from a previous day that are relevant to a user's current context.

It is clear from the above discussion that it is advantageous for a message filtering method and system to use both message textual content and message attribute information. This is provided by the following invention without a database of indexed documents. Rather, a message arrives, and a substantially instant determination is made regarding whether or not to pass the message to a user by joint analysis of the message's body and attribute information.

SUMMARY OF THE INVENTION

This invention reduces the amount of insignificant message traffic received by the user of an electronic information system by jointly exploiting the body and attributes of incoming messages. Message body refers to the portion of the message which the sender intends the recipient to read as the primary source of information. The message attributes provide information about the message. Attribute information includes the sender of the message, the corporate or academic affiliation(s) of the sender, and so on. A feature vector is computed from the message body and attribute information. The feature vector is then provided to a classification step, where a message discriminant score is computed. The message is passed to or withheld from the user based on the value of the discriminant score. In another embodiment, the context of the user's system is used to preferentially pass messages related to the user's current interests. In yet another embodiment, message body and attributes are used to anticipate significant events in a time series, such as streaming financial data.

DETAILED DESCRIPTION OF A PREFERRED EMBODIMENT

Figure 1:
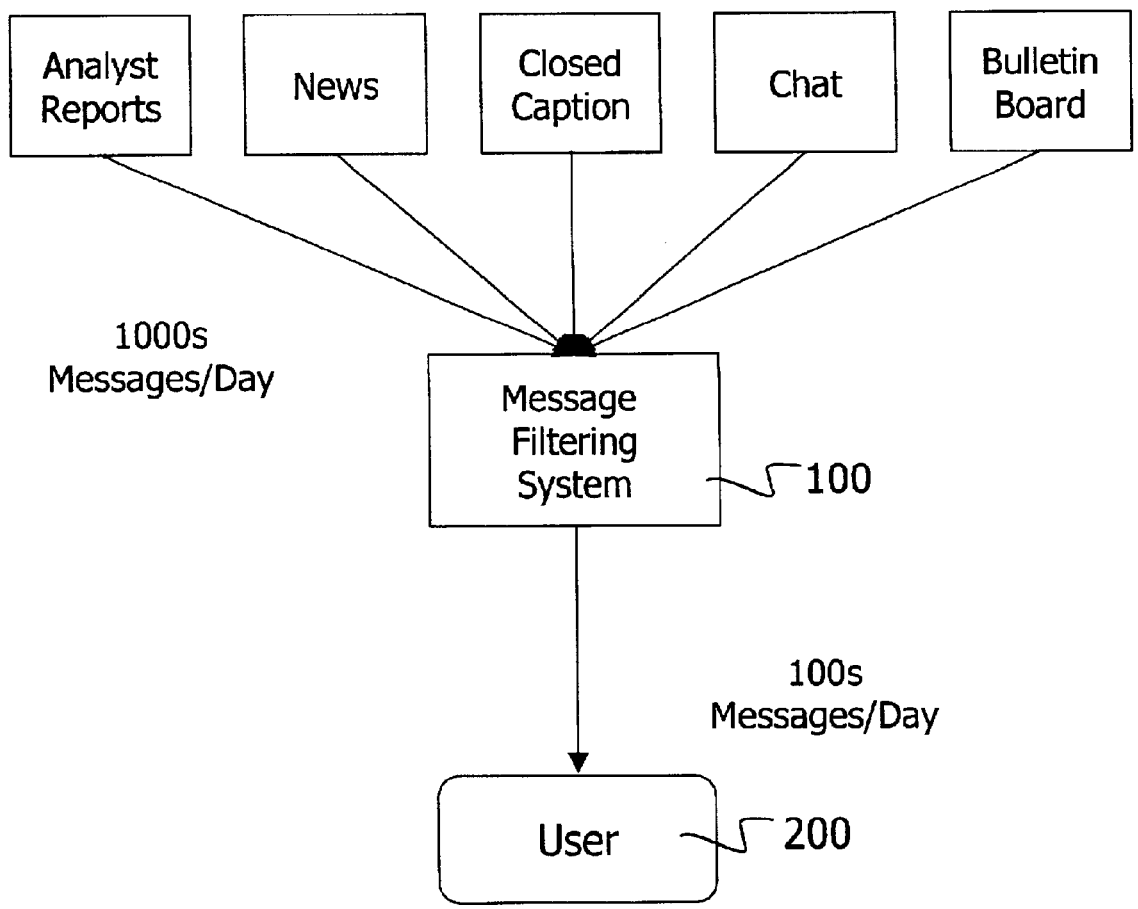
FIG. 1 is the message filtering scenario.

An example scenario is shown in FIG. 1. A user, 200, monitors a variety of message sources such as analyst reports, news, closed caption text, chat rooms and bulletin boards. The combined rate from these sources may be thousands of messages per day. A message filtering system, 100, exploiting both message body and message attributes may be used to reduce the rate to hundreds per day while still providing the analyst with necessary information.

Figure 2:
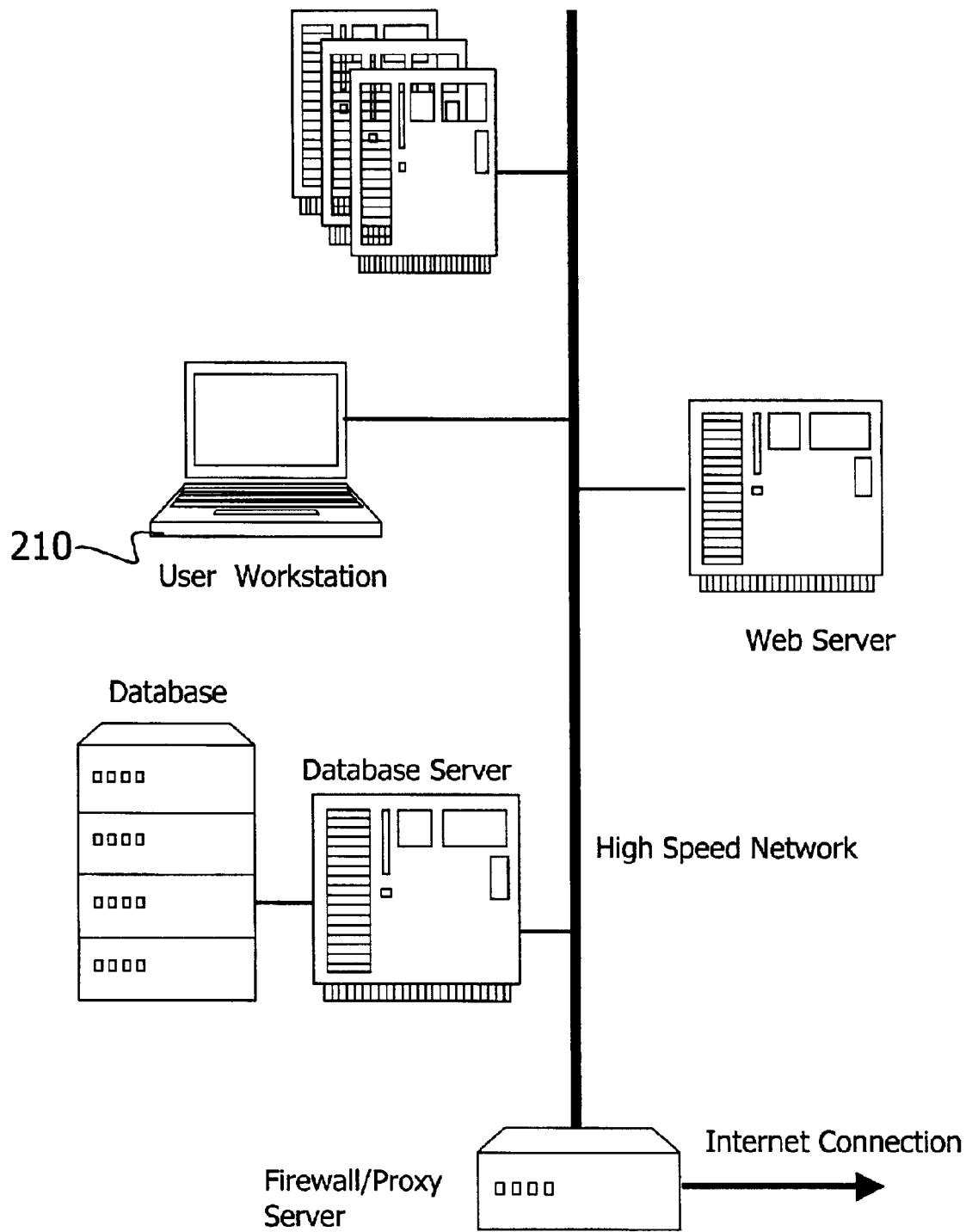
FIG. 2 shows a typical data and computing environment.

FIG. 2 illustrates a typical computing environment. The message filtering system runs on the user workstation, 210. Messages are transferred via the high speed network and may originate from other local users, or external sources via an internet connection.

Figure 3:
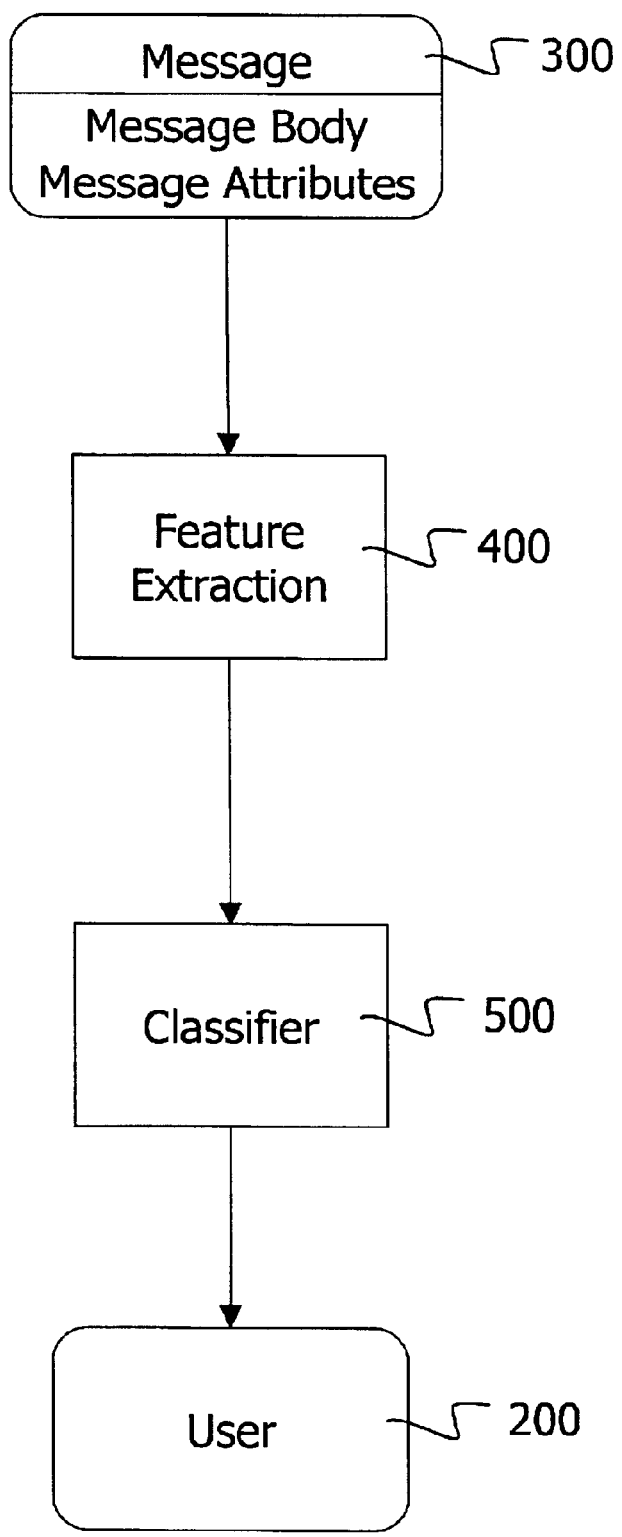
FIG. 3 is an overview of the message filtering system.
Figure 4:
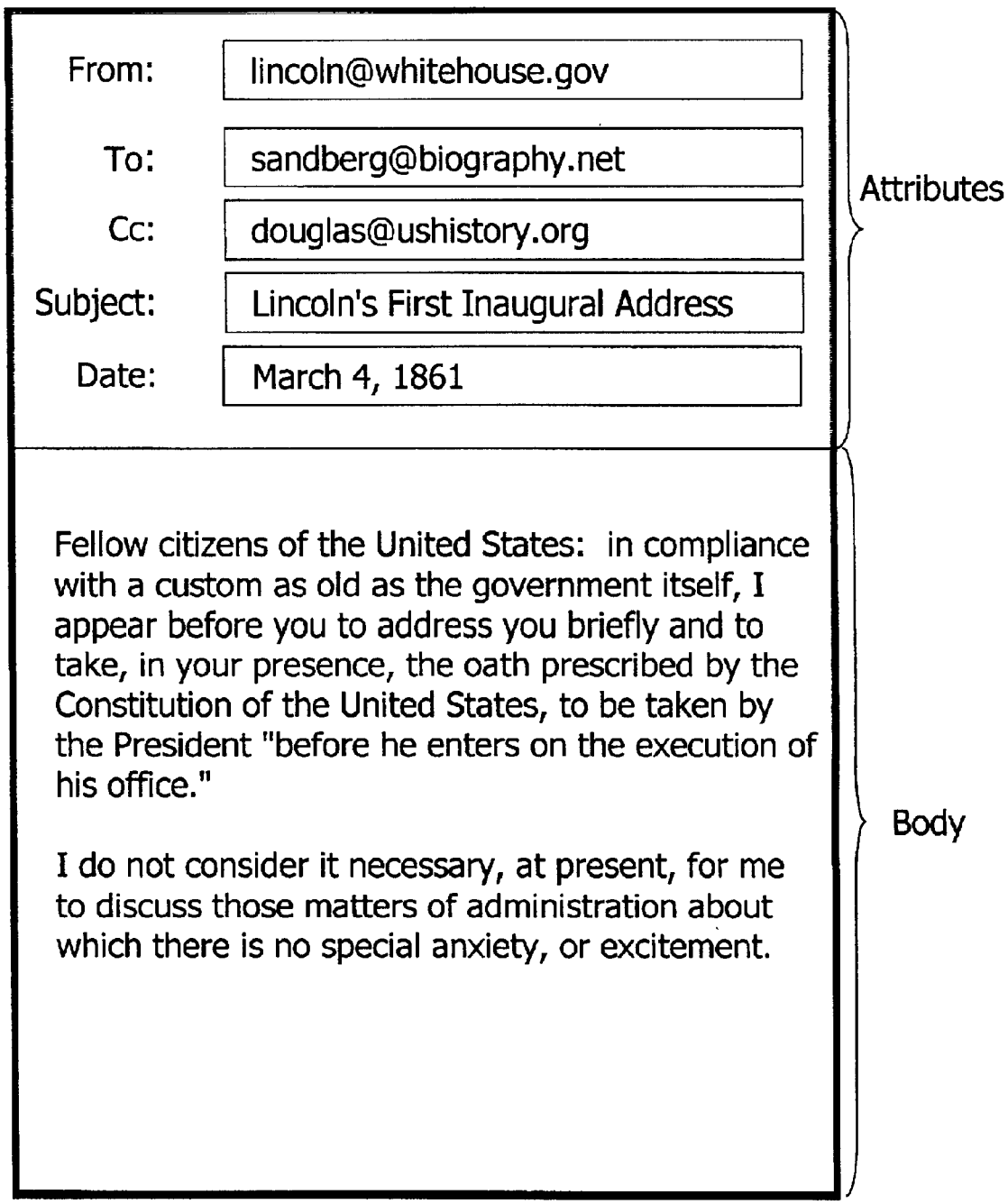
FIG. 4 shows the attribute and body fields of a message.

FIG. 3 is an overview of the message filtering system. Messages are composed of a body and attributes as shown in FIG. 4. A message, 300, is input to the feature extraction step, 400. Here, a feature vector is generated by jointly analyzing the body and the attributes. The feature vector is applied to the classifier, 500. The classifier passes or rejects the message based on the feature vector, such that important messages are passed while rejecting unimportant ones. The user, 200, thereby receives important messages while being relieved of the need to review a large quantity of unimportant messages. The steps of the system are now described in detail.

Feature Generation

Useful features correspond to words associated with message importance. The collection of words useful as features is also known as a dictionary. For example, in a financial setting, "merger" and "downsizing" suggest important messages. Clearly, grammatical variations of these words are also important. Rather than expanding the dictionary to include all possible variations, word stemming is used to map grammatically related words to a fundamental form. Word stemming is known in the art, with the Porter Stemming Algorithm being one example. The fundamental form of the word, the stem, is used to represent all words derived from the stem. Also, common words which lack information content are excluded from consideration.

Figure 5:
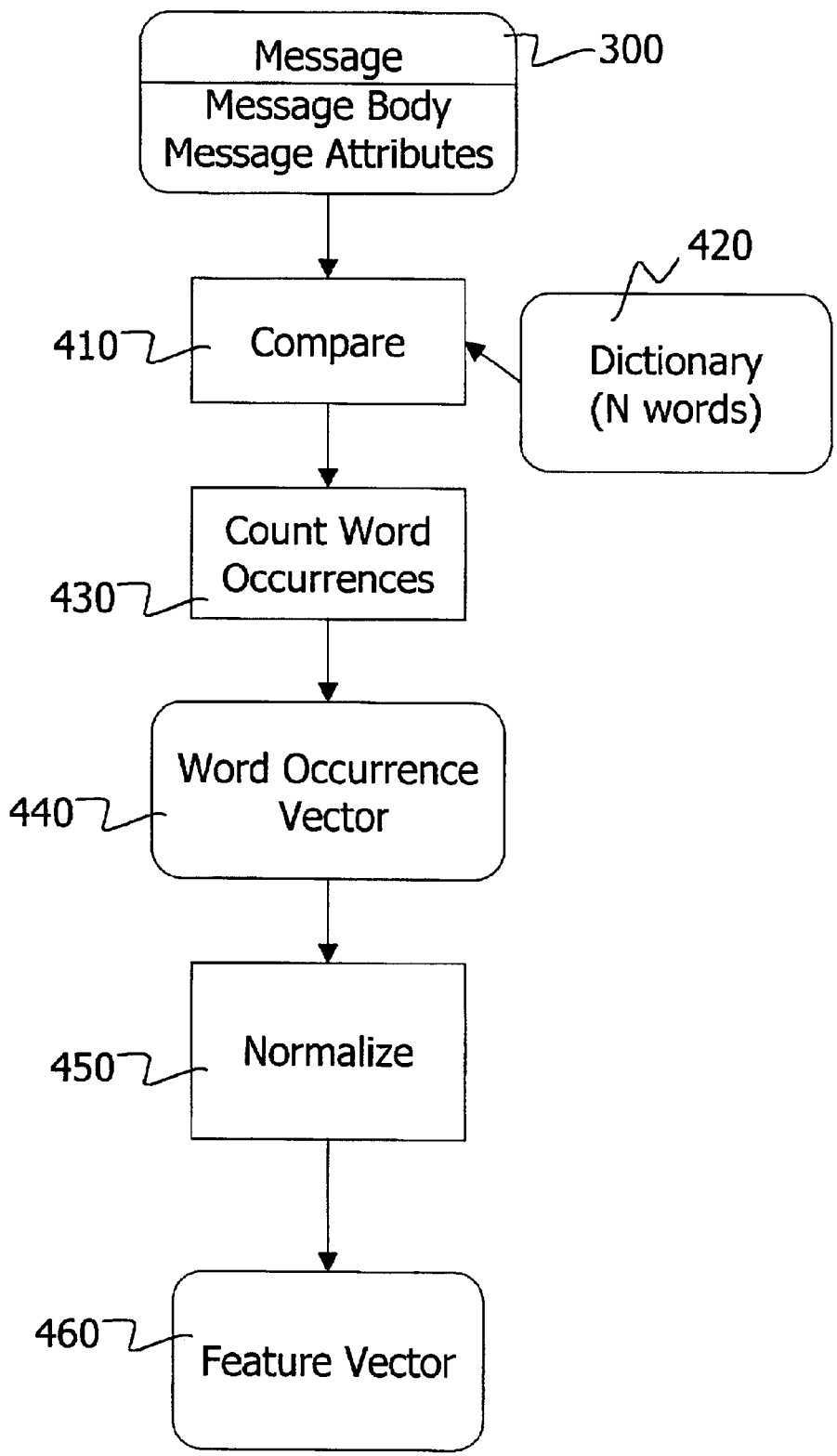
FIG. 5 is an overview of the feature extraction process.

FIG. 5 shows the feature extraction algorithm. The collection of words from the message body and attributes is compared in step 410, to a dictionary of words, 420, obtained during a training phase. The dictionary contains a set of N words, each with a unique integer index. In step 430, an v-element word occurrence vector, 440, is created by counting the number of occurrences of each dictionary word appearing in the message. Thus, the value of the $n^{th}$ dimension in the word occurrence vector represents the number of times the $n^{th}$ dictionary word appears in the message. The feature vector, 460, is formed in a normalization step, 450, by dividing every element by the number of words in the message text. In another embodiment, normalization is provided by dividing the word occurrence vector by the sum of its elements.

Figure 6:
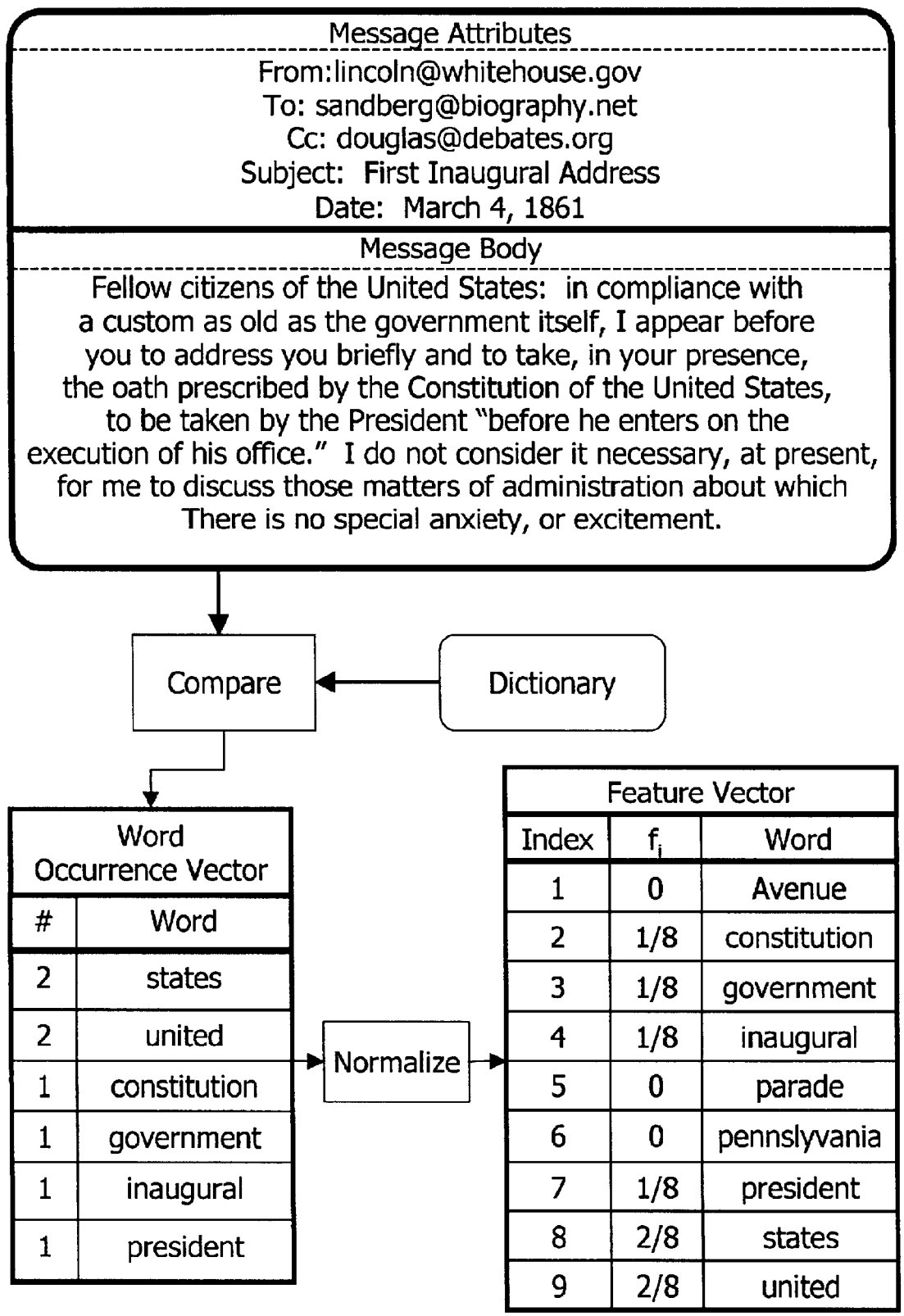
FIG. 6 is a detailed example showing feature vector computation from message attributes and body.
Figure 7:
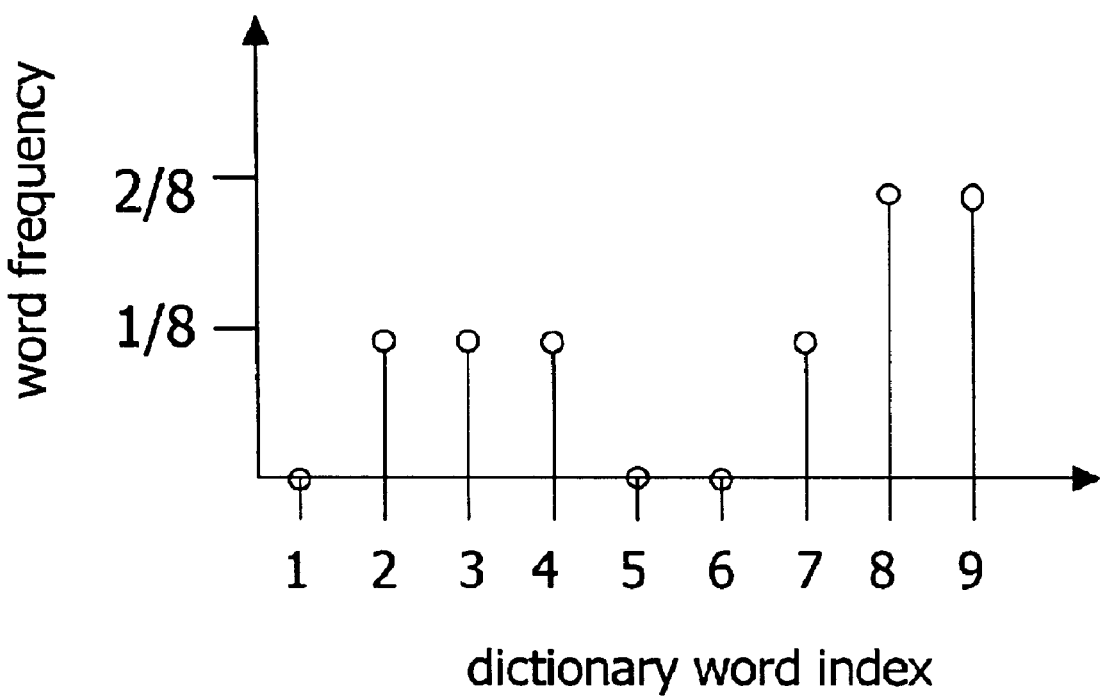
FIG. 7 is an example of a feature vector computed from the message of FIG. 6.

FIG. 6 is an illustrative example of the feature extraction method. For clarity, word stemming is not shown. In this embodiment the normalization is accomplished by dividing the word occurrence vector by the sum of its elements. FIG. 7. shows the feature vector resulting from analysis of the message attributes and body.

CLASSIFICATION

Figure 8:
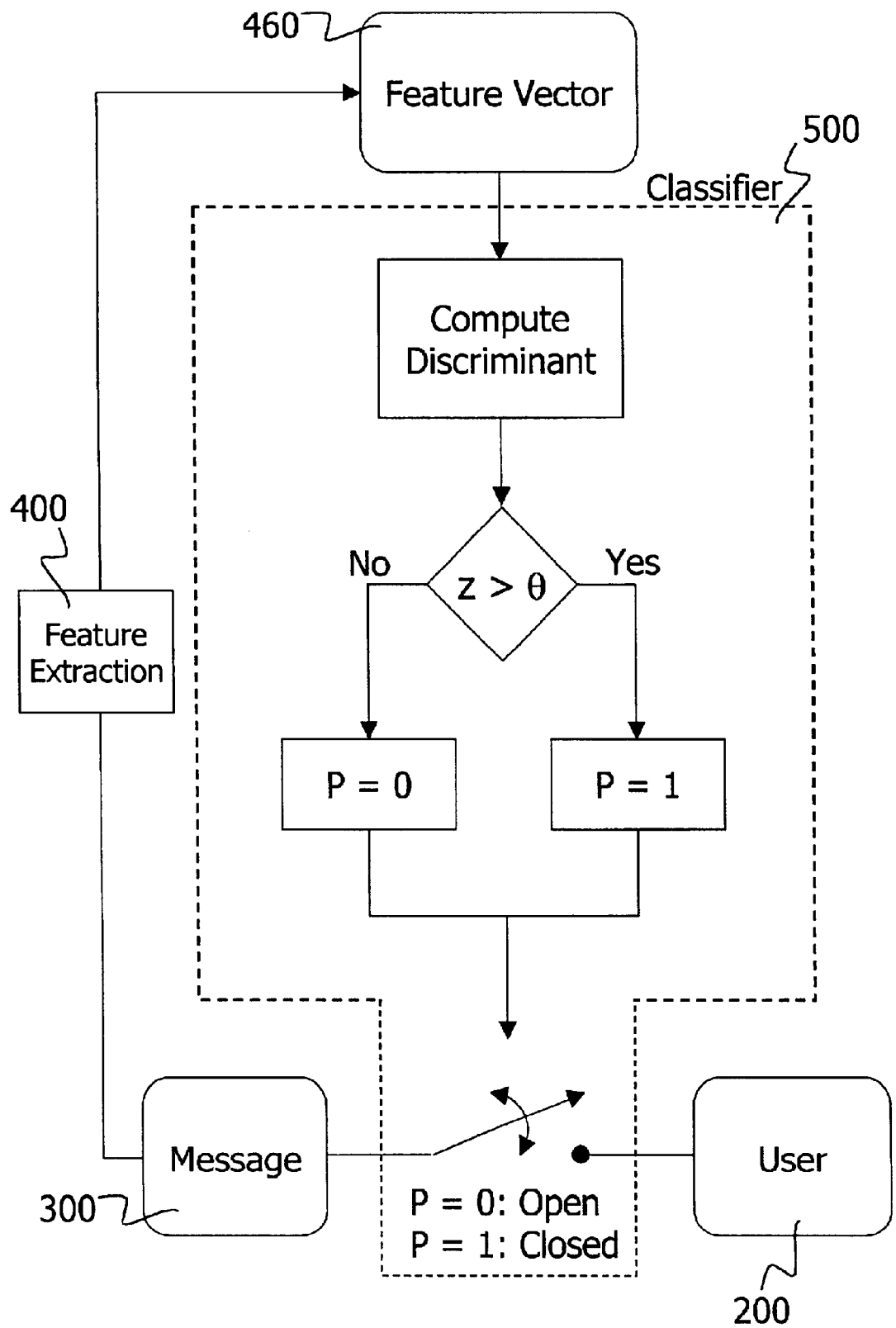
FIG. 8 provides details of the preferred embodiment of the classification step.

The feature vector, 460, is applied to the classifier, 500, as shown in FIG. 8. Message filtering is accomplished by first computing a discriminant value z. The discriminant is compared to a predetermined threshold, θ. If z is greater than θ, a control variable, P is set to '1', otherwise P is set to '0'. In one embodiment, when P equals '1', the message corresponding to the feature vector is displayed to the user. Otherwise, the message is not displayed. In an alternative embodiment, instead of displaying the message to the user when P is '1', an audio or visual cue is issued, indicating the presence of an important message.

Quadratic Classifiers

A quadratic classifier is the preferred embodiment for categorization of messages as important or unimportant. Although quadratic classifiers are well known to those skilled in the art, a brief description follows for clarity. Messages in a training set are partitioned according to their class labels. The mean vectors and covariance matrices are computed for each class using the features under consideration. Then, a quadratic function is formed as $$G_i(X)=(X-M_i)^T\Sigma_i^{-1}(X-M_i) \tag{1}$$

where X is an input feature vector, i is the class index, $M_i$ is the class i mean and $\Sigma_i$ is the class i covariance matrix. Let i=0 represent "unimportant", and i=1 represent "important". Small values of $G_i(X)$ indicate a high probability that the observation belongs to class i.

Consider the difference of discriminants calculated as $$z=G_0(X)-G_1(X) \tag{2}$$

where z is referred to as a discriminant, and z(X) as a discriminant function. The more positive the value of z, the more likely X is from the important category than the unimportant category.

Classification is performed by comparing z to a threshold θ. Varying θ through a range of values provides a Receiver Operation Characteristic (ROC) curve. The ROC curve is analyzed to select an operating point. An operating point represents a trade off between passing enough important messages at the expense of passing too many unimportant messages.

The quadratic classifier is an optimal classification technique, in the minimum probability of error sense, when the features are distributed according to a multivariate Gaussian probability density function. If the distribution of an individual feature vector element is from a gamma distribution, a power transformation of the feature vector element, as in $y=x^\alpha$, can modify the distribution to more closely approximate a Gaussian, or normal, distribution, thereby improving overall classification accuracy. The value for $\alpha$ may be determined empirically by searching for optimal values by applying a range of $\alpha$ values to the data set and measuring a performance metric, such as the Shapiro-Wilks test for normality. The value of $\alpha$ providing the maximal normality metric is selected. Inclusion of $\alpha=1$ in the search range ensures classification performance will not be adversely affected by the power transformation.

During system operation, a message from a stream of messages is input to the message filtering system. Message body data and message attribute data are extracted from the message body and attribute fields, respectively, and the message feature vector is computed jointly from the message body data and the message attribute data. A power transform is applied to each feature vector element as appropriate. The feature vector is input to the classifier. Based on the classifier output, the message may be passed to the user. The user may then choose to read, ignore, save, or delete the passed message.

Classifier Training Phase

Inputs to the training phase include a collection of messages and corresponding binary importance labels provided by an expert, such as the user. The messages are labeled as "important" or "unimportant." The labeling may be obtained by retrospectively examining stored messages and tagging them appropriately. The collection of labeled messages is referred to as training data.

In another embodiment, messages may be labeled in an online fashion. In this case, messages that are acted upon, such as by forwarding, are automatically tagged as important. Conversely, messages that are quickly deleted are tagged as unimportant. The collection of messages and their associated importance labels are input to a feature selection step.

Feature Selection

Feature selection is used to provide the words of the dictionary. It is well known that inclusion of too many features reduces the accuracy of fielded classifiers. Therefore, it is advantageous to perform feature selection.

Figure 9:
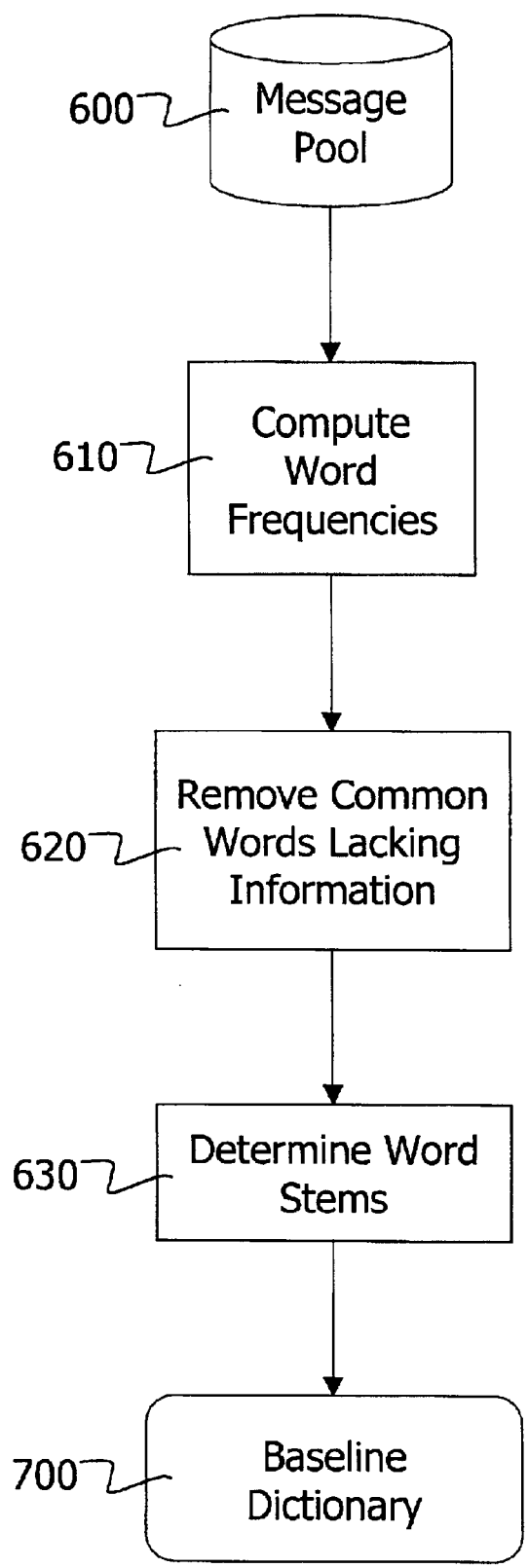
FIG. 9 illustrates the steps for creating the baseline dictionary.
Figure 10:
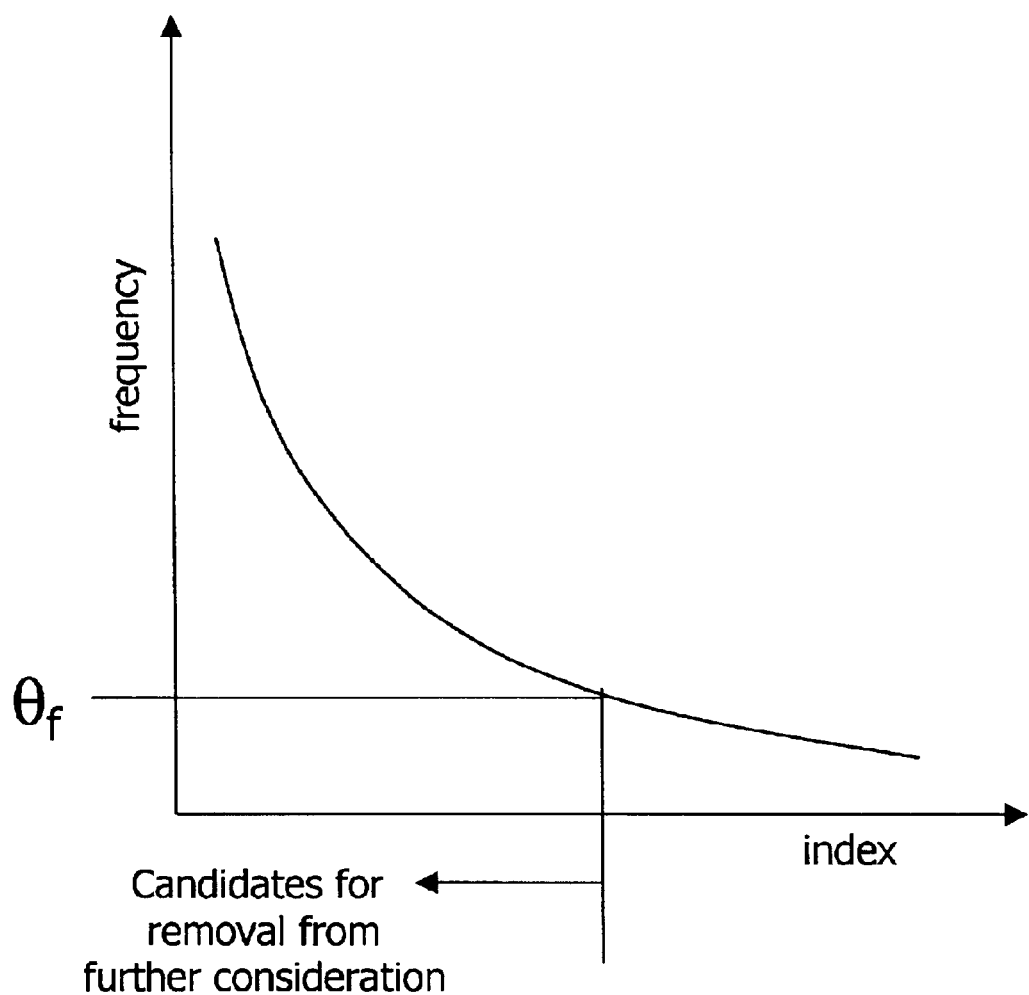
FIG 10 shows the word frequency versus index plot for determination of commonly occurring words.

The first step in creating the dictionary, is to find an initial set of candidate words for the dictionary. This initial set is referred to as the Baseline Dictionary. Formation of the baseline dictionary is shown in FIG. 9. A pool of messages, 600, comprising the collection of messages in a training set is analyzed in step 610 to provide the frequency of occurrence of all words occurring in the training set. The words are sorted from most frequent to least frequent. A plot is formed of the sorted word frequencies versus sorted index, as seen in FIG. 10.

In an offline step, a threshold frequency of occurrence is selected heuristically. Words with frequencies of occurrence greater than this threshold, $\theta_f$, are candidates for removal. These candidates are chiefly words that do not convey information, but are grammatically necessary. The words comprising the candidate for removal set are further analyzed in another offline heuristic step, 620. The purpose of this examination is to prevent frequently occurring word, for example, the word "not," that does convey information from being excluded from the dictionary.

The remaining set of words is then provided to a stemming algorithm, 630, to collapse equivalent forms of the grammatical variations of a word to a common stem word. Any grammatical variations of a word are considered as another occurrence of the corresponding stem word. The set of stem words obtained from the preceding steps provides the baseline dictionary, 700. A feature selection step is used to provide the final dictionary as a subset of the words from the baseline dictionary.

Figure 11:
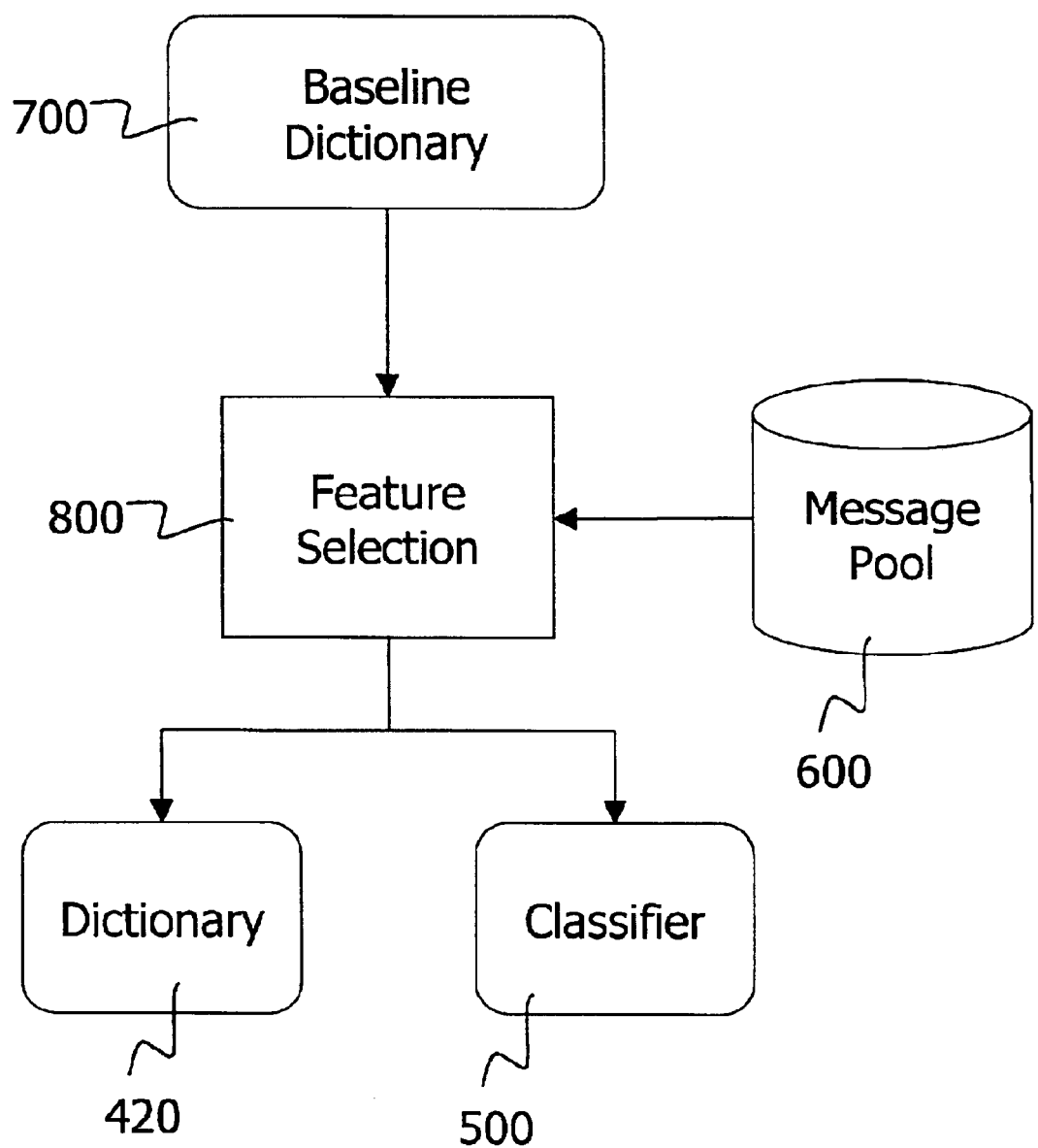
FIG. 11 shows the feature selection process.

Many methods of feature selection are known in the art, one of which is automated forward floating sequential feature selection. Subsets of the words in the baseline dictionary are considered as feature sets during feature selection. Feature sets are grown and pruned in an iterative fashion. A classifier is trained and tested for each candidate feature set. Each set of features has an associated ROC curve which show the fraction of important messages classified as "important" versus the fraction of unimportant messages classified as "unimportant." An overview of the feature selection process, 800, is shown in FIG. 11. This method of feature selection generates the final dictionary as well as the classifier.

The particular set of features to use to build the final dictionary is selected by examining the family of ROC curves generated during the feature selection process. The area or partial area under the ROC curve is used to measure the quality of a feature set. The dictionary is formed as the list of words represented in the feature set with the greatest quality metric.

Figure 12:
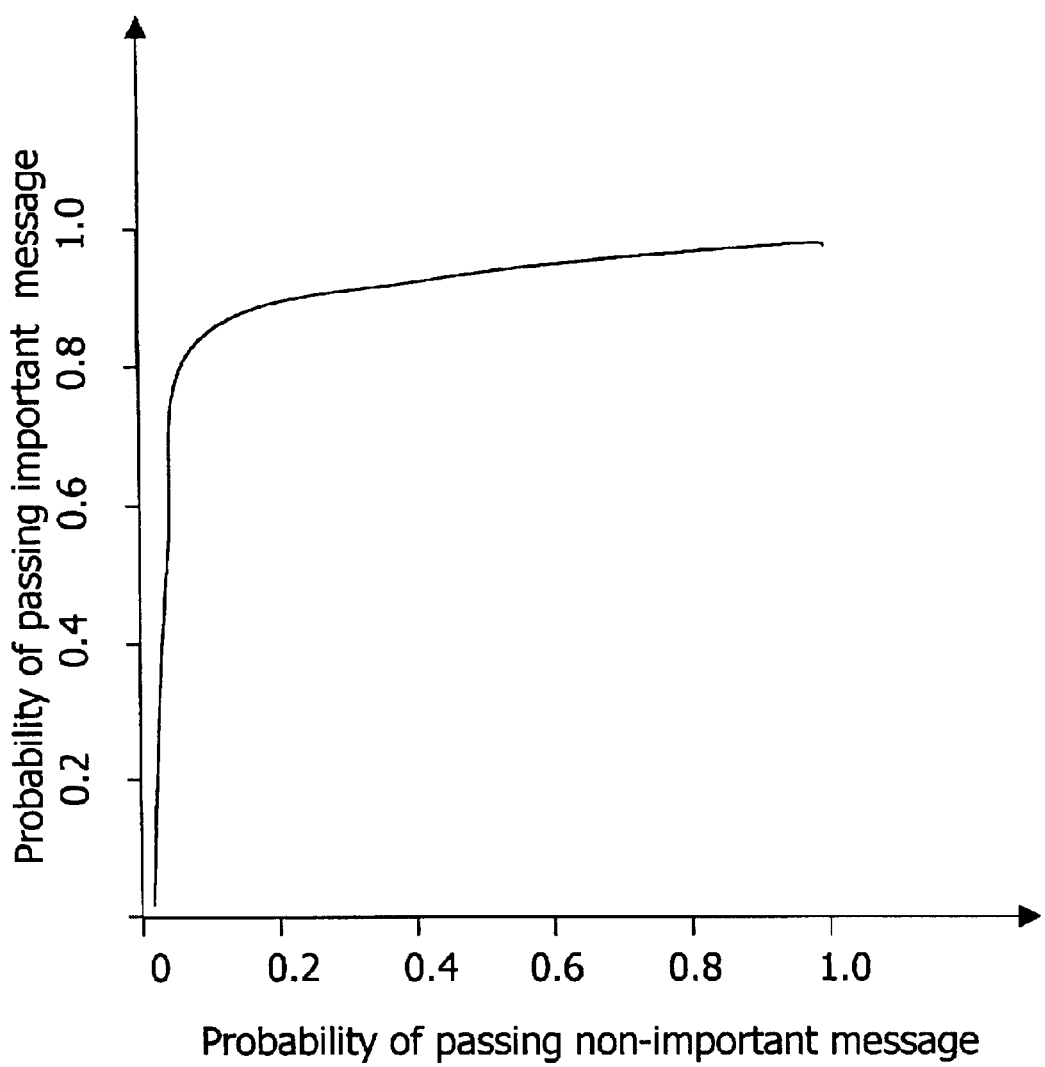
FIG. 12 is a receiver operating characteristic curve and word set for a financial message filtering application.

FIG. 12 is the ROC curve corresponding to a set of features found for a financial message filtering application. This ROC curve shows that approximately 85% of the important messages are passed while passing only 20% of the messages that are unimportant.

Incorporating User Information

Figure 13:
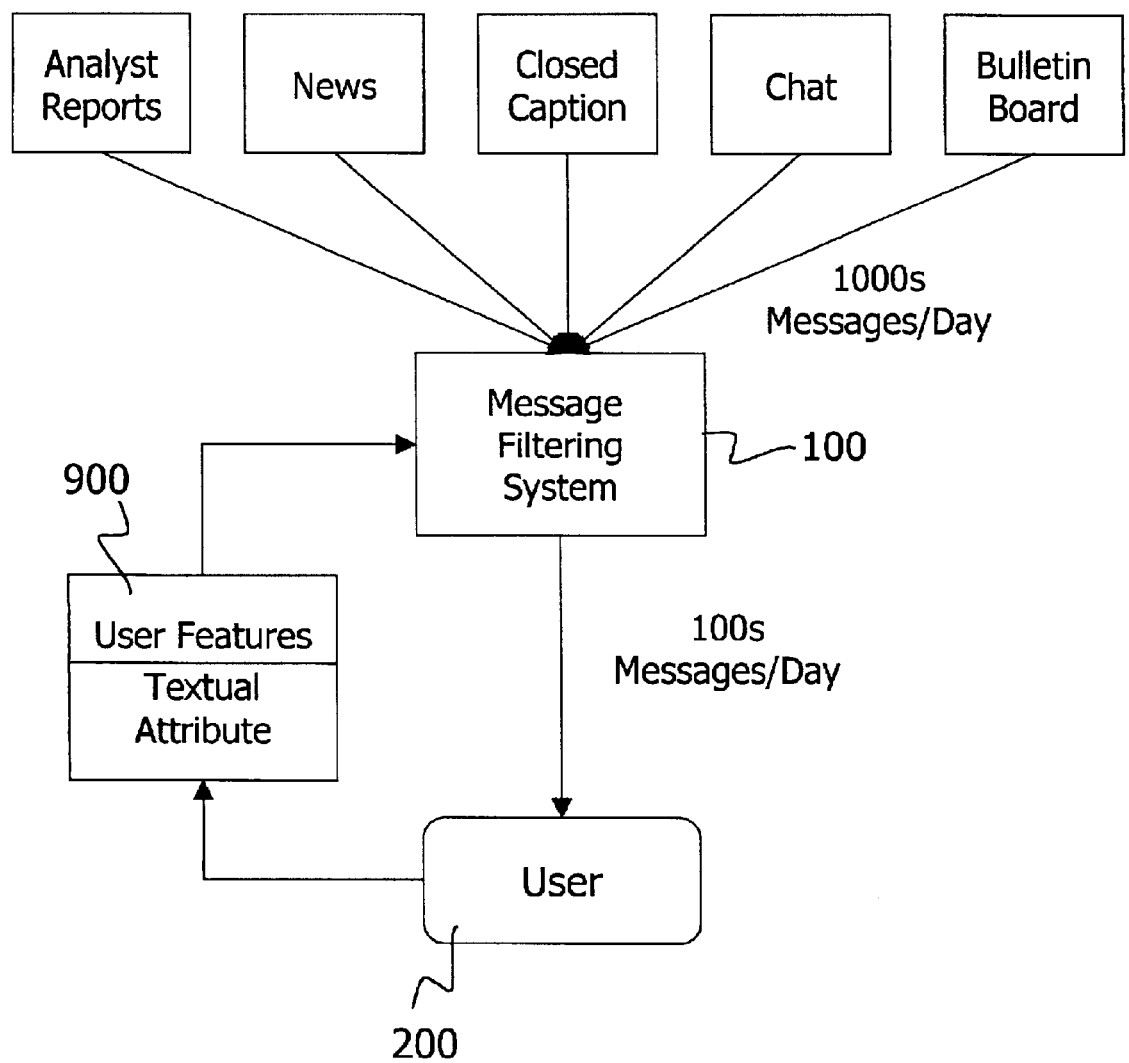
FIG. 13 shows an overview of the message filtering system incorporating features from the user's computing environment.

In another embodiment of the invention, FIG. 13, information regarding the user's computing environment provides preferential treatment for messages related to the user's current interest. User information is obtained by analyzing current and recently used documents, including incoming and outgoing email messages, on the user's computer to create a feature vector. User textual and user attribute features are combined to form a user feature vector, 900, similar to that of the message feature vector. The dictionary used to create the message feature vector is applied to create the user feature vector. User textual features are relative word occurrences from the current and recently used documents. User attribute features are relative word occurrences from the locations, file names, and header-like information from the current and recently used documents. Locations and file names are commonly maintained by the computer operating system, such as in the "Documents" tab of the "Start" button under Microsoft Windows 2000. Header-like information includes attribute information of the name and affiliation of a file owner, such as in the "Properties" portion of Microsoft Office documents. Attribute information from email messages also provides user attribute data.

The information from the collection of recently and currently used documents is used to generate a single user feature vector. The number of documents to retain from the set of those recently and currently used may be limited so as not to exceed to an empirically determined value. A word occurrence vector is formed for each retained document. Then, each of the word occurrence vectors is normalized by dividing each by the sum of their elements. Finally, the normalized word occurrence vectors are summed and divided by the number of retained documents. Since the user feature vector includes word information from a plurality of documents, a richer set of words is likely to be represented than in the message feature vector. The user feature vector is therefore used to modify the message feature vector.

In one embodiment to provide preferential treatment to messages related to the current interests of the user, the similarity of the message feature vector and the user feature vector is computed. One method of measuring similarity of vectors is to compute the cosine of the angle between them. This is equivalent to dividing the inner product of the vectors by the product of their magnitudes as $$z_{m,u} = \frac{x_m \cdot x_u}{|x_m| \cdot |x_u|} \quad (3)$$

The message-user similarity score, $z_{m,u}$, is compared to a threshold, $\theta_{m,u}$. When $z_{m,u}$ exceeds the $\theta_{m,u}$, the message is passed for notification or display to the user.

In another embodiment, a preferentially weighted message feature vector is formed as the element-by-element product of the message and user feature vectors as $$y=[y_i]=x_{m_i} \cdot x_{u_i} \quad (4)$$

where y is the preferentially weighted message feature vector, $y_i$ is the $i^{th}$ element of y, $x_{m_i}$ is the $i^{th}$ element of the message feature vector, and $x_{u_i}$ is the $i^{th}$ element of the user feature vector.

This operation of Equation 4 sets to zero those elements of the message feature vector not occurring in the user feature vector. Furthermore, elements of the message feature vector are scaled in proportion to the relative frequency of words representing the user's current interests. In this embodiment, a current interest classifier is trained using an online method.

Online Training

Online training is the process of modifying system parameters during operation to achieve a more desirable result. In one embodiment, actions of the user are used to label preferentially weighted message feature vectors as "important" or "unimportant". When a message is passed to the user, several actions may occur. The user may: ignore, read and delete, or read and act upon. Messages which are read and acted upon are labeled as "important" and those that are ignored or deleted are labeled as "unimportant". Feature vectors are computed from these messages and tagged with the corresponding label. An online-labeled data set is thus formed. At predetermined intervals, the online labeled data set is used to retrain the classifier.

Retraining the classifier requires two steps. First, a discriminant function is formed from the mean and covariance matrices of the online-labeled data set. Second, a threshold value must be determined from analysis of a ROC curve. The ROC curve is constructed by computing the fraction of important and unimportant messages passing the classifier at a variety of predetermined threshold values.

Feature vectors from the online labeled data set are input to the discriminant function. At each threshold value, the fraction of important and unimportant messages passing the classifier is recorded. A message passes the classifier when its associated feature vector results in a discriminant value greater than the threshold. The threshold value is then selected to provide a desired result in terms of the fraction of important or unimportant messages passing the classifier.

For example, let the desired result be specified as the classifier reducing the unimportant message traffic to 30% of the unfiltered rate. The threshold value corresponding to the desired result is selected from the ROC curve.

Since specification of the desired result determines only one of the two passing fractions, the system should report the corresponding other fraction to the user who may then choose to modify the automatically selected threshold. Consider continuing the example above. Let the automatically determined threshold be selected to pass 30% of the unimportant messages. It may be that this threshold passes only 75% of the important messages. In this case, the user may choose to decrease the threshold to allow the system to pass more of the important messages.

Related Application

In a related application, the methods described above may be used to preferentially pass messages related to significant events. This application is explained by way of a financial example. Stock market data are available in one minute intervals. The sequence of numbers forms a time series representing the history of values for a particular fund, index, or contract. Significant events in the time series may be defined as optimal instances for buy or sell actions. With proper training, a system may be constructed to preferentially pass messages anticipating significant events.

The training method consists of the following steps. Collect a set of messages from the sources over a time period. Messages consist of attribute and body information. Importantly, attribute information includes the creation time of the message, and the message source. Next, obtain the time series of the time period corresponding to that of the messages. Examine the time series for significant events. The key idea is significant events are used to label messages as "important" or "unimportant".

Significant events may be identified by experts, or determined algorithmically. Experts may identify times when "buy" or "sell" actions should occur. For an algorithmic example, let significant events be defined as the absolute value of the difference between NASDAQ samples separated by 5 minutes being greater than 8 points.

Figure 14:
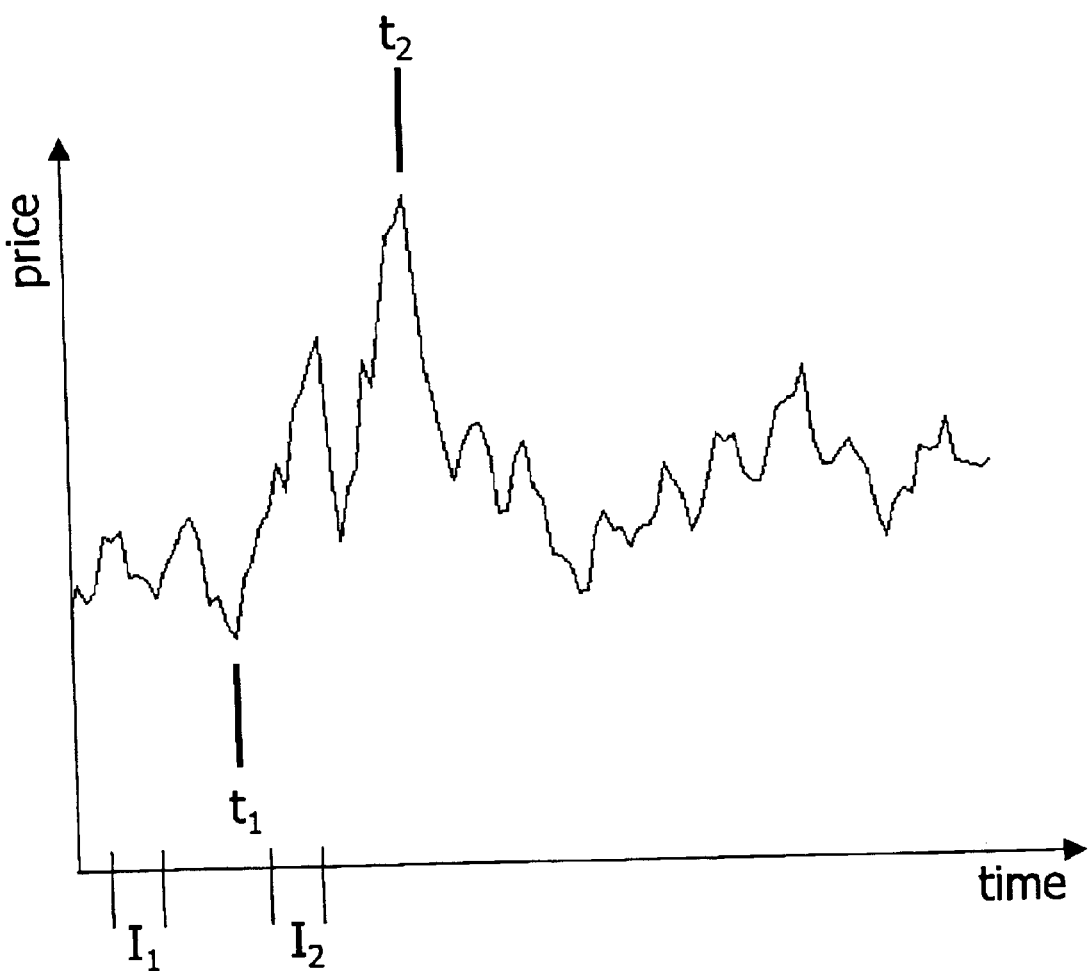
FIG. 14 shows a time series with identification of significant events and preceding intervals.
Figure 15:
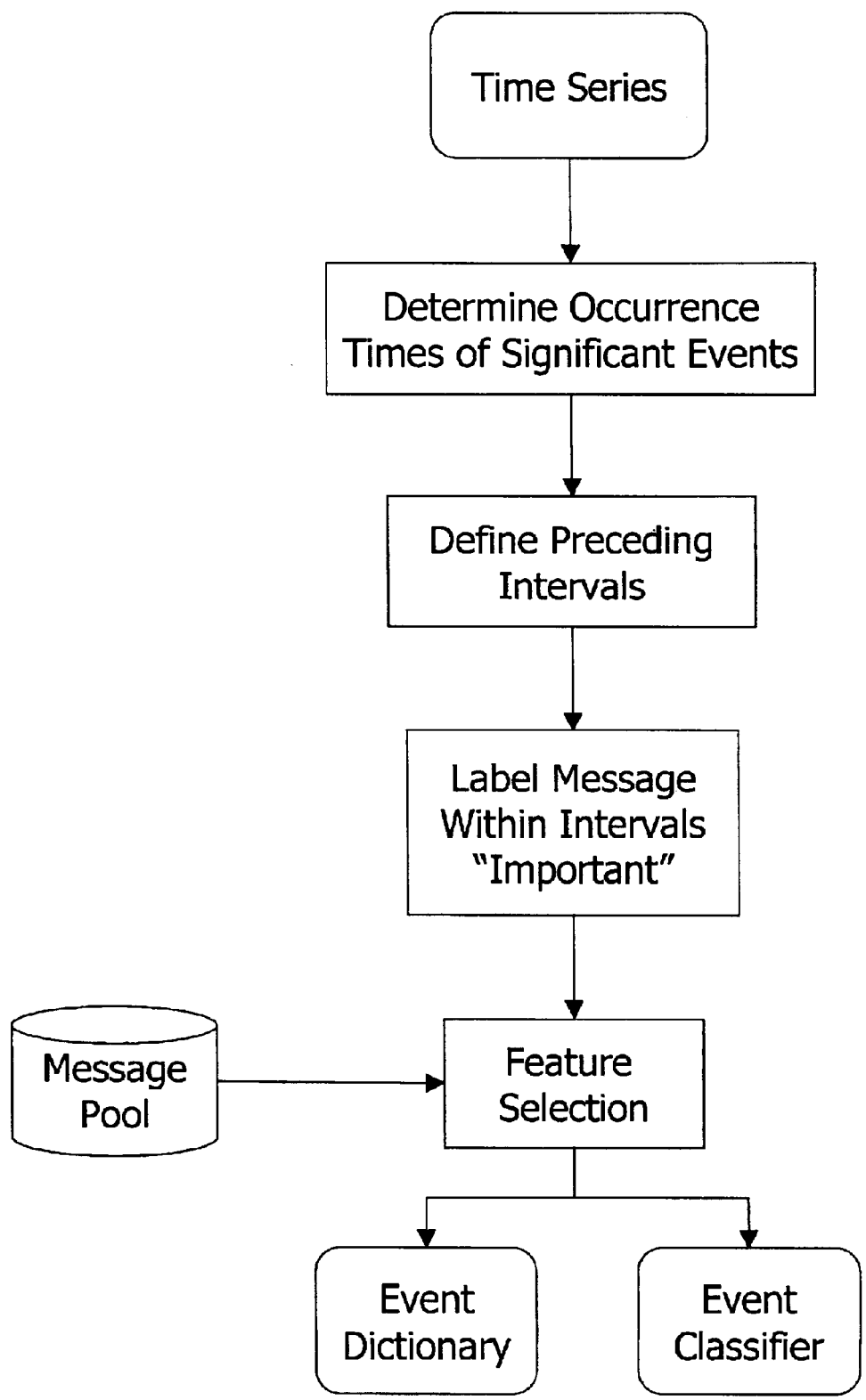
FIG. 15 shows an overview of training the message filtering system to anticiapate significant events.

Message labeling is accomplished by using the significant events. FIG. 14 shows a time series with two significant events occurring at times $t_1$ and $t_2$. Intervals $I_1$ and $I_2$ are identified at times preceding the occurrences of the significant events. FIG. 15 shows the method for obtaining a classifier which will pass messages anticipating the significant events. Messages are recorded over a period of time to form a message pool. A time series is analyzed to determine occurrence times of significant events. Intervals preceding these times are then defined. All messages occurring within these defined intervals are labeled as "important." Messages occurring at other times are labeled as "unimportant". Feature selection using methods disclosed above provides an event dictionary and event classifier.

Figure 16:
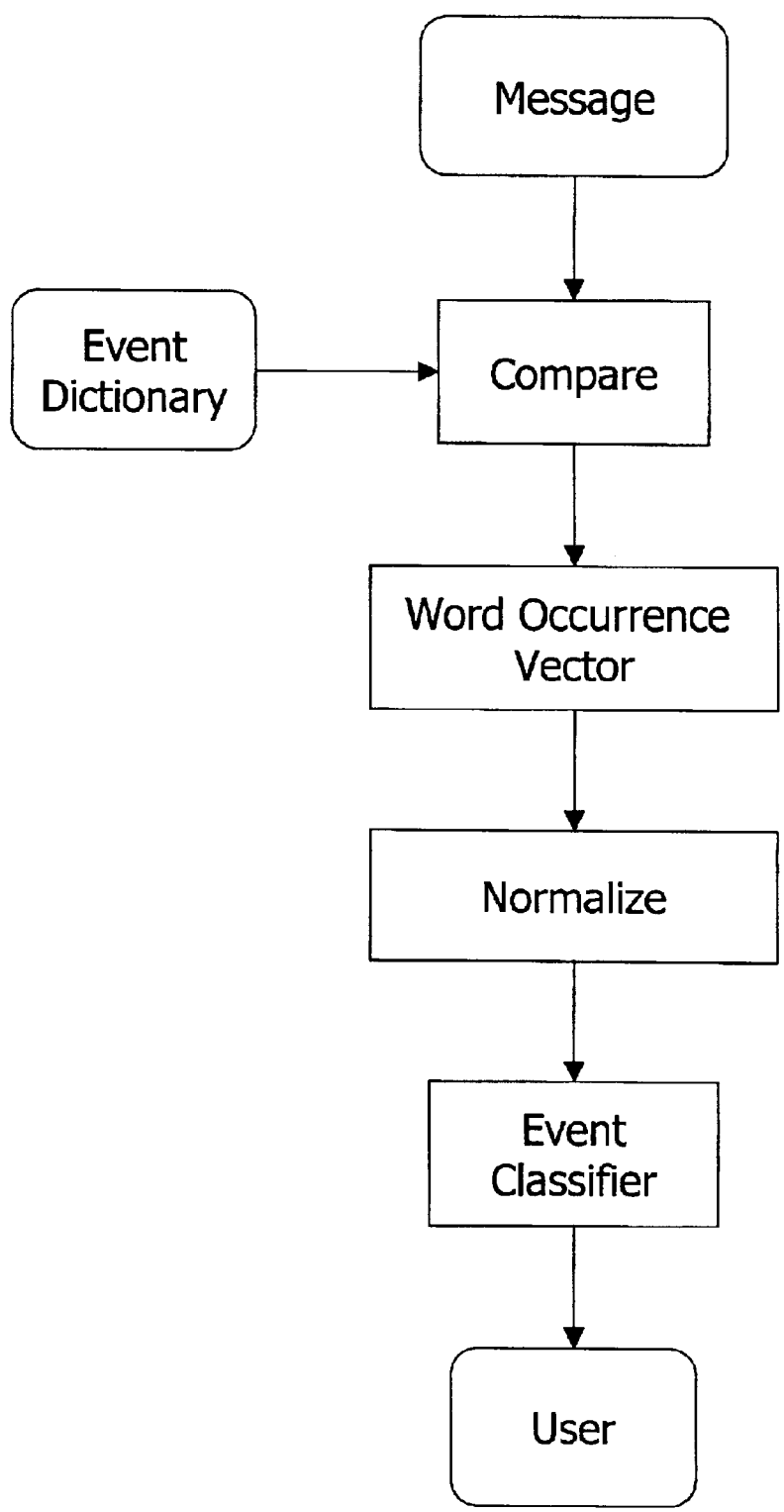
FIG. 16 illustrates the system for passing messages which anticipate significant events.

The resultant event classifier then passes messages anticipating the significant event, as shown in FIG. 16. The body and attributes of a message are compared to the words in the event dictionary. A feature vector is formed as described in the message filtering system by computing a word occurrence vector, then normalizing. The feature vector is then input to the event classifier to determine if the corresponding message is passed to the user. In this application, inclusion of attribute information is especially critical to successful performance of the system.

While the methods herein described constitute preferred embodiments of this invention, it is to be understood that the invention is not limited to these precise methods and that changes may be made without departing from the scope of the invention, which is defined in the appended claims.

What is claimed is:

1. A method for message filtering comprising the steps of:
   extracting message body data from a message body portion of a message;
   extracting message attribute data from the message, where the message attribute data is derived from the group comprising: message source, author, date, day of week, time of day, corporate affiliation, and academic affiliation;
   computing a message feature vector jointly from the message body data and the message attribute data;
   computing a message discriminant score using the message feature vector; and passing or withholding the message based on the discriminant score.

2. The method of claim 1, wherein a prompt is given to the user to indicate when a message is passed.

3. The method of claim 2, wherein the prompt is an audio cue.

4. The method of claim 2, wherein the prompt is a visual cue.

5. The method of claim 2, wherein the prompt is an audiovisual cue.

6. The method of claim 1, wherein the-message is displayed to the user when passing.

7. A method for message filtering comprising the steps of:
   extracting message body data from a message body portion of a message;
   extracting message attribute data from the message;
   computing a message feature vector jointly from the message body data and the message attribute data;
   computing user textual features from the user environment;
   computing user attribute features from the user environment;
   computing a user feature vector jointly from the user textual features and the user attribute features;
   computing a message-user similarity score from the message feature vector and the user feature vector;
   passing or withholding the message based on the message-user similarity scores; and
   wherein the user environment comprises documents currently in use and recently used documents.

8. The method of claim 7, wherein the message-user similarity score is computed according to the formula:

$$z_{m,u} = \frac{x_m \cdot x_u}{|x_m| \cdot |x_u|}.$$

9. A method for filtering messages arriving in an online system, the method comprising the steps of:
   providing a plurality of incoming messages from an online system to a user;
   receiving an input from the user instructing the online system to act upon an incoming message;
   labeling each incoming message in response to the instruction from the user to act upon the incoming message to create an online labeled data set;
   training a classifier with the online labeled data set; and
   wherein the classifier is retrained at predetermined intervals with current online data sets, formed from recently received incoming messages, to provide a classifier for identifying messages of current interest to the user.

10. The method of claim 9, wherein the input from the user comprises an instruction to ignore the incoming message.

11. The method of claim 9, wherein the input from the user comprises an instruction to read and then delete the incoming message.

12. The method of claim 9, wherein the input from the user comprises an instruction to read and perform a further action upon the incoming message.

13. The method of claim 12, wherein the further action comprises forwarding the message.

14. The method of claim 9, wherein the incoming messages are passed to the user by the classifier, and the classifier is retrained using the online labeled data set.

15. The method of claim 9, wherein the step of training a classifier comprises the steps of:
   computing feature vectors from messages;
   computing feature vectors from the user environment;
   computing a preferentially weighted message feature vector according to the formula:

$$y=[y_i]=x_{m_i} x_{u_i}.$$

* * * * *